US009367977B2

(12) United States Patent
Lee

(10) Patent No.: US 9,367,977 B2
(45) Date of Patent: Jun. 14, 2016

(54) APPARATUS, METHOD AND SYSTEM FOR CONTROLLING SMART KEY

(71) Applicant: Hyundai Motor Company, Seoul (KR)

(72) Inventor: Jae Jun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 14/294,693

(22) Filed: Jun. 3, 2014

(65) Prior Publication Data

US 2015/0130588 A1 May 14, 2015

(30) Foreign Application Priority Data

Nov. 13, 2013 (KR) ........................ 10-2013-0137829

(51) Int. Cl.
*G05B 19/00* (2006.01)
*G07C 9/00* (2006.01)

(52) U.S. Cl.
CPC .... *G07C 9/00309* (2013.01); *G07C 2009/0038* (2013.01)

(58) Field of Classification Search
CPC ..................... G97C 9/0309; G07C 2009/0038; G06K 19/0712
USPC ......................................... 340/5.61, 5.8, 7.29
See application file for complete search history.

(56) References Cited

U.S. PATENT DOCUMENTS

| | | | | |
|---|---|---|---|---|
| 8,947,222 B2 * | 2/2015 | DeLuca | A45C 13/18 | 340/457 |
| 2009/0029675 A1 * | 1/2009 | Steinmetz | H04K 3/415 | 455/410 |

FOREIGN PATENT DOCUMENTS

| | | | |
|---|---|---|---|
| JP | 2005-325540 A | 11/2005 |
| JP | 2006104663 A | 4/2006 |
| JP | 2010-203066 A | 9/2010 |
| JP | 2013046163 A | 3/2013 |
| JP | 2013-209845 A | 10/2013 |
| KR | 10-2012-0035442 A | 4/2012 |
| KR | 10-2012-0114598 | 10/2012 |
| KR | 10-2013-0013567 | 2/2013 |

* cited by examiner

*Primary Examiner* — Vernal Brown
(74) *Attorney, Agent, or Firm* — Mintz Levin Cohn Ferris Glovsky and Popeo, P.C.; Peter F. Corless

(57) ABSTRACT

An apparatus, a method, and a system are provided for controlling a smart key. The smart key control apparatus includes a smart key controller that is configured to transmit a wake-up signal for a smart key when a start-up command is detected in a start-off state of a vehicle and authenticate the smart key based on a response of the smart key that corresponds to the wake-up signal. In addition, a peripheral controller is configured to adjust a power level of a neighboring portable terminal when an authentication for the smart key fails and a communicator is configured to transmit and receive a signal between the smart key and the portable terminal.

14 Claims, 6 Drawing Sheets

APPARATUS, METHOD AND SYSTEM FOR CONTROLLING SMART KEY

CROSS-REFERENCE TO RELATED APPLICATION

This application claims the benefit of priority to Korean Patent Application No. 10-2013-0137829, filed on Nov. 13, 2013 in the Korean Intellectual Property Office, the disclosure of which is incorporated herein in its entirety by reference.

BACKGROUND

1. Field of the Invention

The present invention relates to an apparatus, a method and a system for controlling a smart key, and more particularly, to a technology for controlling a power level of a neighboring portable terminal when authenticating the smart key.

2. Description of the Related Art

Generally, a smart key system authenticates a smart key in a smart key controller through a communication between a smart key control apparatus and a smart key, and enables to start a drive of a vehicle under control of the authenticated smart key.

Recently, as a portable device is widely used, a driver may possess at least one portable device. In this case, an electromagnetic wave may be generated due to the portable device possessed by the driver. The electromagnetic wave generated by the portable device affects a signal which is transmitted and received between the smart key controller and the smart key, thereby generating a problem of mistakenly recognizing a transmission and reception signal, or even not recognizing the signal.

SUMMARY

The present invention provides an apparatus, a method, and a system for controlling a smart key to stably communicate between a smart key control apparatus and a smart key by adjusting a power level of a portable terminal when an electromagnetic wave generated from a portable terminal in the vicinity of a vehicle affects a communication between the smart key control apparatus and the smart key.

In accordance with an aspect of the present invention, a smart key control apparatus may include: a smart key controller configured to transmit a wake-up signal for a smart key when a start-up command is detected in a start-off state of a vehicle, and authenticate the smart key based on a response of the smart key that corresponds to the wake-up signal; a peripheral controller configured to adjust a power level of a neighboring portable terminal when an authentication for the smart key fails; and a communicator configured to transmit and receive a signal between the smart key and the portable terminal.

The peripheral controller may be configured to transmit a control signal that requests entry of the portable terminal into a low power mode. In addition, the peripheral controller may be configured to determine a power mode status of the portable terminal based on a response signal from the portable terminal that corresponds to the control signal. The peripheral controller may be configured to transmit a control signal that requests a release of the low power mode of the portable terminal during a completion of the authentication of the smart key when the portable terminal enters the low power mode.

The smart key controller may be configured to retransmit the wake-up signal when the portable terminal enters the low power mode during authentication failure of the smart key. The smart key controller may be configured to determine that the authentication of the smart key has failed, when an error signal generated from the smart key is received when 1-bit or 2-bit error for the wake-up signal occurs. The smart key controller may also be configured to determine that the authentication of the smart key has failed, when a response signal is not received within a certain period of time from the smart key in response to the wake-up signal. The communicator may be configured to transmit a signal to the smart key using a low frequency (LF) communication method, and receive a signal from the smart key using a radio frequency (RF) communication method. The communicator may be configured to transmit and receive a signal with the portable terminal using a short-distance wireless communication method which may be one of a near field communication (NFC) and Bluetooth.

In accordance with another aspect of the present invention, a method of controlling a smart key may include: transmitting a wake-up signal for the smart key when a start-up command is detected in a start-off state of a vehicle; authenticating the smart key based on a response of the smart key that corresponds to the wake-up signal; requesting entry of a neighboring portable terminal into a low power mode when an authentication for the smart key has failed; and retransmitting the wake-up signal when the portable terminal enters the low power mode. After the of the retransmitting the wake-up signal, the method further may further include requesting a release of the low power mode of the portable terminal, during a completion of the authentication of the smart key based on a response of the smart key that corresponds to the wake-up signal.

In accordance with another aspect of the present invention, a smart key control system may include: a smart key; a smart key controller configured to transmit a wake-up signal to the smart key when a start-up command is detected in a start-off state of a vehicle, and adjust a power level generated from surroundings based on a result of key authentication of the smart key by the wake-up signal; and a portable terminal configured to operate in a low power mode by the smart key controller during authentication between the smart key and the smart key controller.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
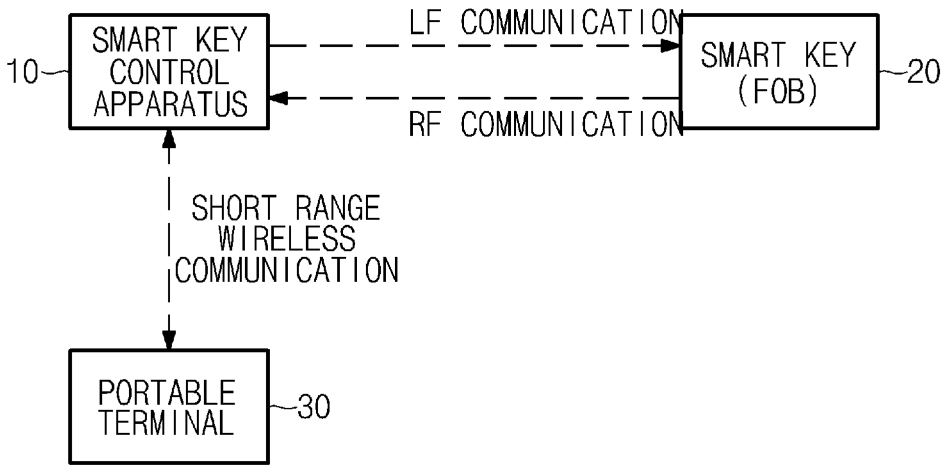
FIG. 1 is an exemplary diagram illustrating a configuration of a smart key control system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

FIG. 1 is an exemplary diagram illustrating a configuration of a smart key control system according to an exemplary embodiment of the present invention. Referring to FIG. 1, the smart key control system may include a smart key control apparatus 10, a smart key 20 and a portable terminal 30.

The smart key control apparatus 10 may be configured to perform a corresponding operation via a communication with the smart key 20 when a command for operation which may be started by the smart key 20 is detected by a controller in a start-off state of vehicle. As an example, when a command for start-up is detected in the start-off state of vehicle, a controller of the smart key control apparatus 10 may be configured to perform a key authentication via communication with the smart key 20, and may start a vehicle by a start signal from the authenticated smart key 20.

The smart key 20 may be configured to remotely control the locking operation of the vehicle door, and control the vehicle start-up. Furthermore, the smart key 20 may be configured to start the operation of the vehicle via a communication with the smart key control apparatus 10 while being mounted in a FOB holder. In particular, the smart key control apparatus 10 and the smart key 20 may perform a wireless communication. As an example, the smart key control apparatus 10 (e.g., a controller of the apparatus) may be configured to transmit a signal of preset frequency band to the smart key 20 via a LF communication method, and may be configured to receive a signal from the smart key 20 via a RF communication method.

The portable terminal 30 may be a terminal configured to generate an electromagnetic wave over a predetermined level in the vicinity (e.g., a predetermined range around) of the smart key control apparatus 10 while performing a communication between the smart key control apparatus 10 and the smart key 20. Further, the portable terminal 30 may be a terminal that may perform a short-range wireless communication such as a near field communication (NFC), and Bluetooth, with the smart key control apparatus 10. As an example, portable terminal 30 may be a mobile communication terminal, a tablet personal computer (PC), a notebook PC, and the like, but is not limited thereto.

In particular, the smart key control apparatus 10 may be configured to transmit a wake-up signal to the smart key 20 for the operation start of the vehicle, and may be configured to perform a key authentication based on the signal received from the smart key 20 in response to the wake-up signal. However, when the smart key control apparatus 10 transmits the wake-up signal, when the wake-up signal includes a noise due to the electromagnetic waves generated by the portable terminal 30, the smart key 20 may not correctly read the wake-up signal. Accordingly, the smart key 20 may be configured to generate an error signal or may not respond, and the smart key control apparatus 10 may be configured to adjust the power level for at least one neighboring portable terminal 30 based on the response of the smart key 20 to resume the communication with the smart key 20. Thus, a specific operation of the smart key control apparatus 10 is described in more detail with reference to FIG. 2.

Figure 2:
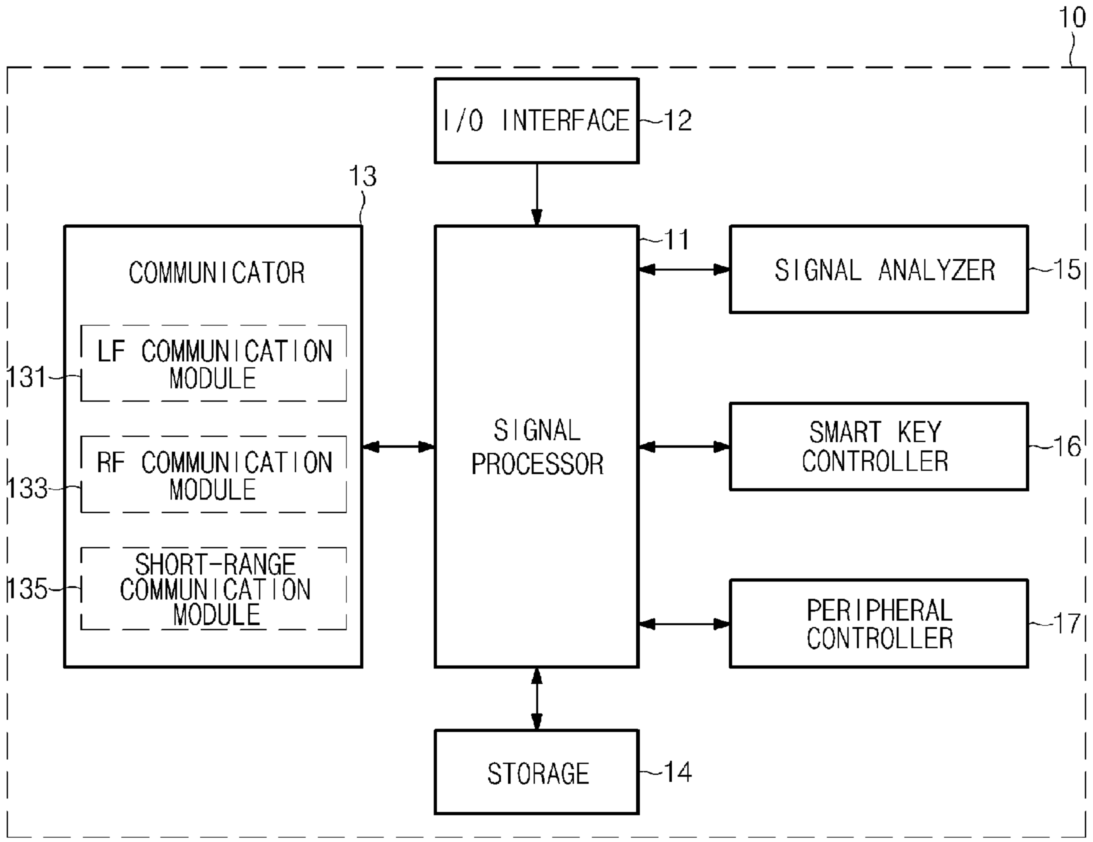
FIG. 2 is an exemplary block diagram illustrating a configuration of a smart key control apparatus according to an exemplary embodiment of the present invention.

FIG. 2 is an exemplary block diagram illustrating a configuration of a smart key control apparatus according to an exemplary embodiment of the present invention. Referring to FIG. 2, the smart key control apparatus 10 according to the present invention may include a signal processor 11, an input and output interface 12, a communicator 13, a storage (e.g., a memory) 14, a signal analyzer 15, a smart key controller 16, and a peripheral controller 17. In particular, the signal processor 11 may be configured to process a signal transmitted between each unit of the smart key control apparatus 10.

The input and output interface 12 may be connected with at least one of a start button disposed within the vehicle and a passive lock/unlock button, and may be configured to receive a command generated by the operation of the button. Further, the input and output interface 12 may be configured to transmit the command input by the operation of the at least one connected button to the smart key controller 16 via the signal processor 11. In addition, the input and output interface 12 may be connected with a drive unit of the vehicle, and may be configured to transmit a drive command generated based on the start signal from the smart key received via the communicator 13 to a corresponding drive unit. As an example, the input and output interface 12 may be configured to transmit a start-up command generated based on the start-up signal from the smart key to a starting device of the vehicle.

The communicator 13 may include a communication module configured to support the communication interface to transmit and receive a signal to and from the smart key. As an example, the communicator 13 may include a LF communication module 131 configured to transmit a low frequency (LF) signal of a preset frequency band, e.g., about 125 kHz, 134 kHz, and the like, to the smart key, and may include a RF communication module 133 configured to receive a radio frequency (RF) signal of a preset frequency band, e.g., about 433 MHz, and the like, from the smart key.

Furthermore, the communicator 13 may include a communications module configured to support a communication interface to transmit and receive a signal with a neighboring portable terminal. As an example, the communicator 13 may include a short-range communication module 135 configured to transmit and receive a signal with a portable terminal via a communication method such as a near field communication (NFC), Bluetooth, and the like.

The memory 14 may be configured to store a set value for operation of the smart key control apparatus 10. In particular, the controller may be configured to store the set value onto the memory 14. As an example, the memory 14 may be configured to store frequency information of signal defined for signal transmission and reception with the smart key, and may be configured to store information for authentication of the smart key. Further, the storage 14 may be configured to store a control algorithm for controlling the vehicle drive by a start signal of the smart key. In addition, the storage 14 may be configured to store information set to transmit and receive signal with the portable terminal, and a control algorithm for controlling the power level of the portable terminal.

The signal analyzer 15 may be configured to analyze signal received from the smart key via the RF communication module 133. In particular, the signal analyzer 15 may be configured to analyze whether the signal received from the smart key is a response signal received in response to the wake-up signal generated by the smart key controller 16 or a start signal received in response to a request signal generated by the smart key controller 16, and transmit the analysis result to the smart key controller 16.

When at least one of the start button disposed within the vehicle and the passive lock/unlock button is operated, when a command by button operation is input via the input and output interface 12, the smart key controller 16 may be configured to generate a wake-up signal for driving the smart key to transmit to the smart key via the LF communication module 131. When a response signal that corresponds to the wake-up signal is received via the RF communication module 133, the smart key controller 16 may be configured to perform an authentication for a corresponding smart key based on the result of the signal analysis of the signal analyzer 15.

Further, when data of response signal received from the smart key is substantially similar with pre-registered data, the smart key controller 16 may be configured to complete the authentication for a corresponding smart key, and generate a request signal that corresponds to a command input via the input and output interface 12 to transmit to the smart key via the LF communication module 131. Further, when receiving the start signal that corresponds to the request signal via the RF communication module 133, the smart key controller 16 may be configured to output a command to drive a corresponding drive unit of the vehicle via the input and output interface 12 based on the start signal.

Moreover, when the data of response signal received via the RF communication module 133 is not substantially similar (e.g., is different than) to pre-registered data, the smart key controller 16 may be configured to determine that the authentication for a corresponding smart key has failed. As an example, when receiving an error signal generated from the smart key while generating a 1-bit or 2-bit error for the wake-up signal, the smart key controller 16 may be configured to determine that the authentication for the smart key has failed. In particular, it may be assumed that the error signal generated by the smart key is not substantially similar with the pre-registered data. Accordingly, the smart key controller 16 may be configured to determine that the key authentication has failed due to a nose generated by the neighboring portable terminal, and may be configured to transmit the result of authentication failure of the smart key to the peripheral controller 17.

The peripheral controller 17 may be configured to adjust the power level of the neighboring portable terminal, in response to determining that the authentication for the smart key from the smart key controller 16 has failed. In particular, the peripheral controller 17 may be configured to transmit a control signal that requests an entry to a low power mode to the portable terminal of pre-registered user via the short-range communication module 135. In addition, the peripheral controller 17 may be configured to search the neighboring portable terminal via the short-range communication module 135, and may transmit a control signal that requests an entry to a low power mode to the searched portable terminal via the short-range communication module 135. In particular, it may be assumed that an application for entering a low power mode has previously been installed in the portable terminal, and a corresponding application may be executed when a control signal generated from the peripheral controller 17 is received, to allow the portable terminal to enter a low power mode.

Further, the peripheral controller 17 may be configured to determine the power mode status of the portable terminal based on a response signal, when the response signal is received from the portable terminal in response to the control signal. In other words, the peripheral controller 17 may be configured to determine that a corresponding portable terminal enters the low power mode based on the response signal from the portable terminal. Accordingly, the peripheral controller 17 may be configured to transmit the entry into a low power mode of the portable terminal to the smart key controller 16.

When the authentication for the smart key has failed, when the portable terminal enters the low power mode by the peripheral controller 17, the smart key controller 16 may be configured to retransmit the wake-up signal to the smart key via the LF communication module 131. In particular, the smart key controller 16 may be configured to complete the authentication for a corresponding smart key when the data of the response signal received from the smart key in response to the retransmitted wake-up signal is substantially similar with the pre-registered data, and generate a request signal that corresponds to the command input via the input and output interface 12 to transmit to the smart key via the LF communication module 131. When the start signal that corresponds to the request signal is received via the RF communication module 133, the smart key controller 16 may be configured to output a command to drive a corresponding drive unit of vehicle via the input and output interface 12 based on the start signal.

Moreover, when the portable terminal enters the low power mode, the peripheral controller 17 may be configured to transmit a control signal that requests for a release of low power mode when the authentication for the smart key is completed via the short-range communication module 135. Thus, the smart key control apparatus 10 may enable the portable terminal to enter the low power mode to minimize a surrounding noise while performing an authentication between smart keys during authentication failure with the smart key, to allow the smart key authentication to be performed when the surrounding noise is removed.

Figure 3:
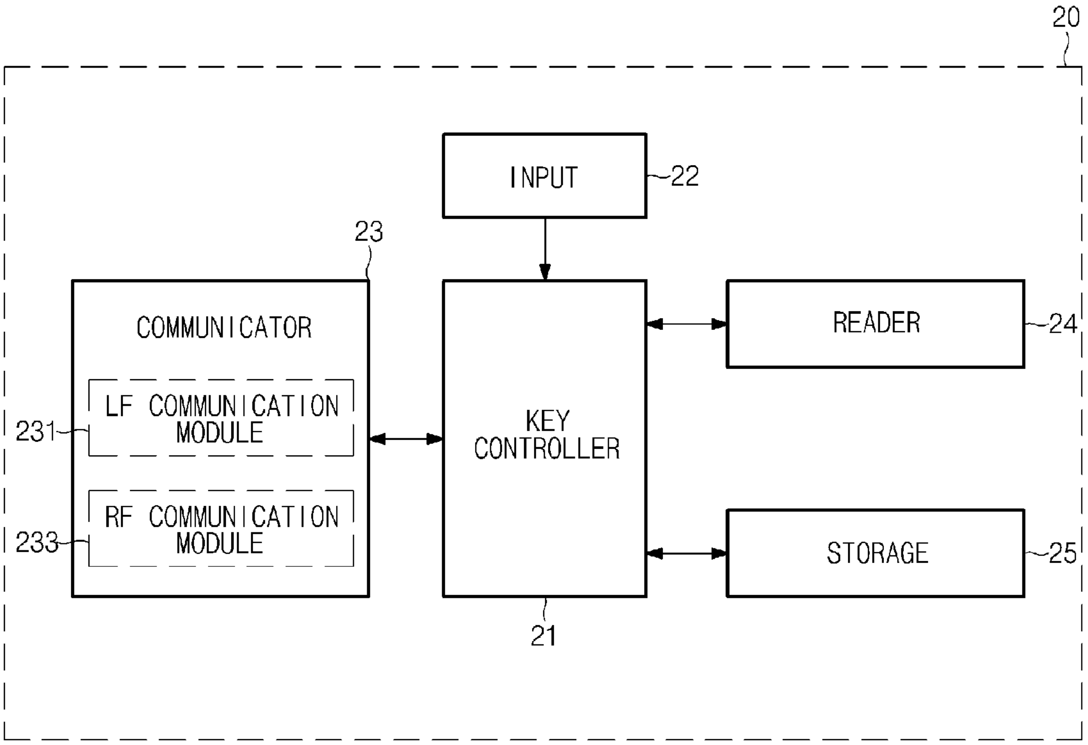
FIG. 3 is an exemplary block diagram illustrating a configuration of a smart key according to an exemplary embodiment of the present invention.

FIG. 3 is an exemplary block diagram illustrating a configuration of a smart key according to an exemplary embodiment of the present invention. Referring to FIG. 3, the smart key 20 may include a key controller 21, an input 22, a communicator 23, a reader 24 and a memory 25. The key controller 21 may be configured to execute the operation of each unit of the smart key 20.

At least one operation button may be disposed within the smart key 20. In particular, the input 22 may be configured to receive a command that corresponds to the operated button when operating the button indisposed within the smart key 20. The communicator 23 may include a communication module configured to support a communication interface to transmit and receive a signal to and from the smart key controller. As an example, the communicator 23 may include an LF communication module 231 configured to receive a low frequency (LF) signal such as about 125 kHz, 134 kHz, and the like, from the smart key controller, and may include a RF communication module 233 configured to transmit a signal of a preset frequency band, for example, a radio frequency (RF) signal such as about 433 MHz, and the like, to the smart key controller.

The reader 24 may be configured to read a signal received via the LF communication module 231. For example, the reader 24 may be configured to read a wake-up signal received via the LF communication module 231, and read the request signal received via the LF communication module 231 during the completion of the authentication of the smart key 20. In particular, the key controller 21 may be configured to generate a response signal that corresponds to the reading result of the reader 24 and transmit to the smart key controller via the RF communication module 233.

Additionally, the key controller 21 may be configured to compare the reading result of the reader 24 with the data stored in the memory 25 and generate a response signal based on the comparison result. In other words, when the wake-up signal is received from the smart key controller, the key controller 21 may be configured to compare the reading result of the reader 24 with the data stored in the memory 25, and generate a response signal to confirm the reception of wake-up signal to transmit to the smart key controller when the reading result is substantially similar to the data.

Moreover, the key controller 21 may be configured to compare the reading result of the reader 24 with the data stored in the memory 25, determine that an error has occurred when data of one bit or two bits are not substantially similar (e.g., are different), and transmit an error signal to the smart key controller. In particular, the memory 25 may be configured to store a communication set value for transmitting and receiving a signal between the smart key 20 and the smart key control apparatus, and store information for generating a signal.

Furthermore, the key controller 21 may be configured to compare the reading result of the reader 24 with the data stored in the memory 25, and may not respond to the wake-up signal when data of three or more bits is not substantially similar. In particular, the smart key control apparatus may perform no operation when a response signal that corresponds to the wake-up signal is not received from the smart key 20. In addition, the smart key control apparatus may determine that an error has occurred when the response signal that corresponds to the wake-up signal is not received from the smart key 20 within a certain time period, and retransmit the wake-up signal after adjusting the power level of the neighboring portable terminal.

Figure 4:
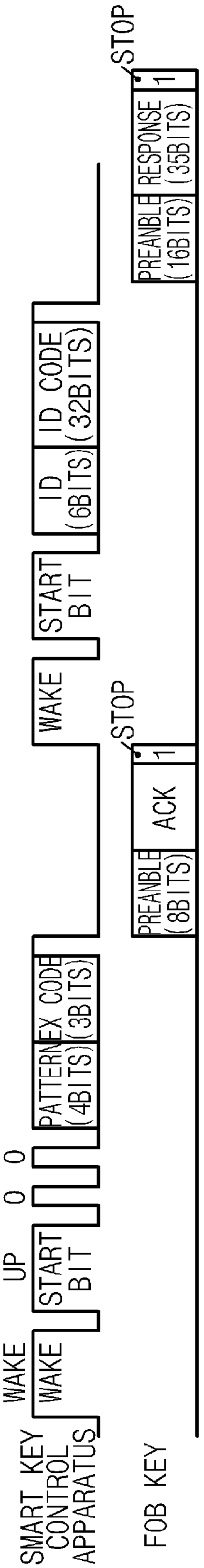
FIG. 4 is an exemplary diagram illustrating a configuration of signal between a smart key control apparatus and a smart key according to an exemplary embodiment of the present invention.

FIG. 4 is an exemplary diagram illustrating a configuration of signal between a smart key control apparatus and a smart key according to an exemplary embodiment of the present invention. As shown in FIG. 4, the smart key control apparatus may be configured to transmit the wake-up signal to the smart key by the operation of the start key or the passive lock/unlock button. The wake-up signal may include a wake (WAKE), a start bit (START BIT), a pattern (PATTERN, 4BITS) and an execution code (EX CODE, 3BITS).

The smart key (e.g., a controller of the smart key) may be configured to compare each bit of received wake-up signal with the bit of pre-stored data while reading the wake-up signal received from the smart key control apparatus, and may be configured to determine whether at least one bit which is not substantially similar exists. Further, the smart key may be configured to transmit a response signal that corresponds to the received wake-up signal to the smart key control apparatus. In particular, the response signal that corresponds to the wake-up signal may include a preamble (PREAMBLE, 8BITS), acknowledgment (ACK) and a stop bit (STOP BIT). Specifically, an ACK field of the response signal may include reception completion information of pre-defined wake-up signal, and may include error information for the wake-up signal.

When the error information is included in the response signal received from the smart key, the controller of the smart key control apparatus may be configured to transmit the wake-up signal to the smart key after adjusting the power level of the neighboring portable terminal. When the reception completion information of the wake-up signal is included in the response signal received in response to the transmitted wake-up signal, the controller of the smart key control apparatus may be configured to complete the authentication for a corresponding smart key, and transmit a request signal to the smart key. The request signal may include a wake (WAKE), a start bit (START BIT), an ID (ID, 6BITS), and an ID code (ID CODE, 35BITS).

Furthermore, the smart key may be configured to transmit a response signal to the smart key control apparatus in response to the received request signal. The response signal that corresponds to the request signal may include a preamble (PREAMBLE, 16BITS), a response (RESPONSE, 35BITS), and a stop bit (STOP BIT). In particular, a RESPONSE field of the response signal may include operation start information for operation request included in the request signal.

Figure 5:
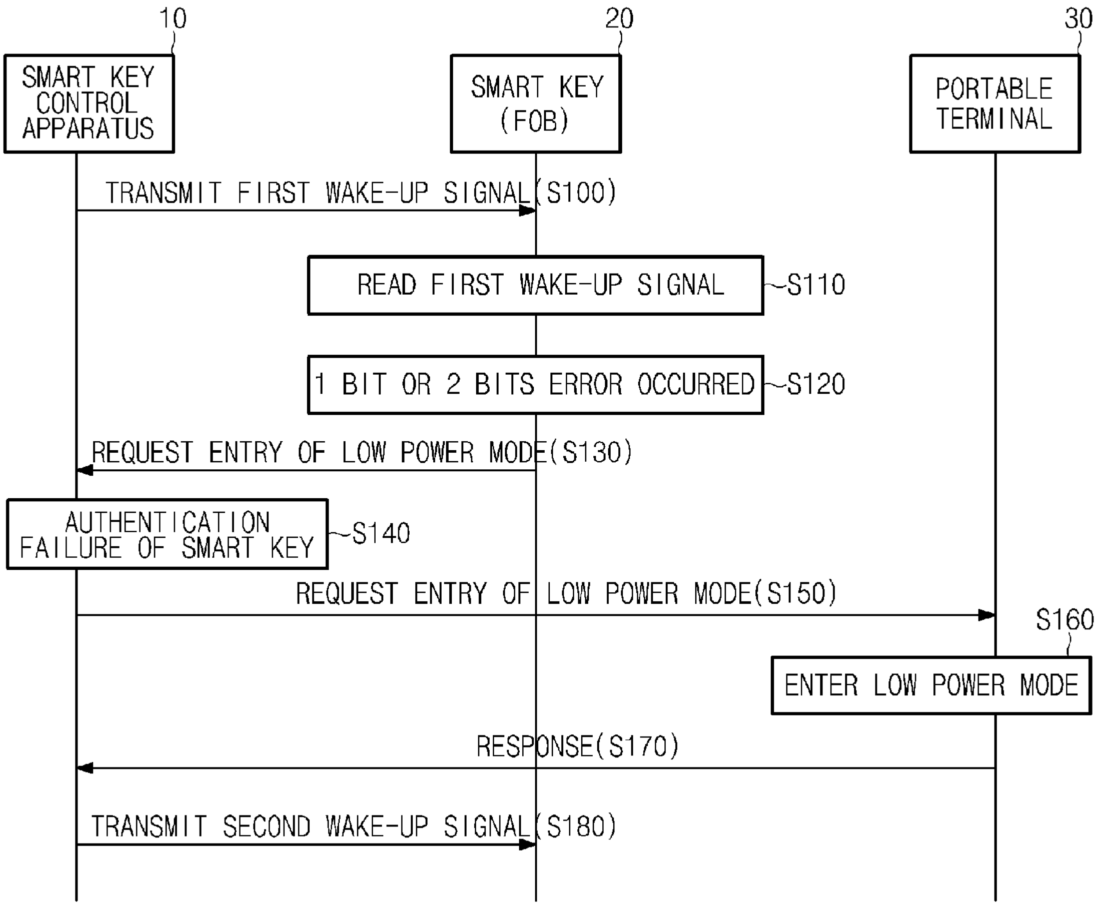
FIGS. 5 and 6 are exemplary flowcharts illustrating a smart key control method according to an exemplary embodiment of the present invention.
Figure 6:
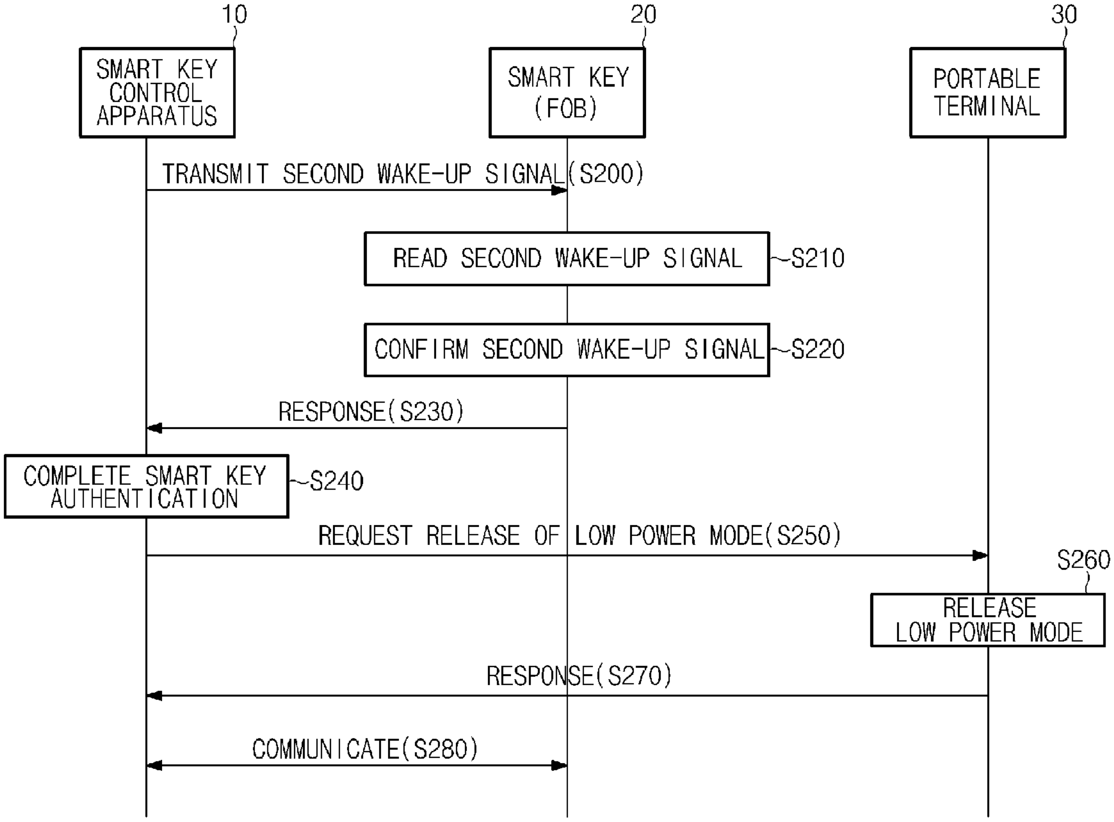

The operation flow of the smart key control apparatus according to the present invention is described in more detail as follows. FIGS. 5 and 6 are exemplary flowcharts illustrating a smart key control method according to an exemplary embodiment of the present invention.

First, FIG. 5 illustrates an exemplary operation flow of controlling the portable terminal to enter a low power mode during communication between the smart key control apparatus and the smart key. Referring to FIG. 5, the smart key control apparatus may be configured to transmit a first wake-up signal (first WAKE UP) to the smart key, when the start button or the passive lock/unlock button is operated (S100).

The smart key (FOB) 20 may be configured to read the first wake-up signal received at step 'S100' (S110), and, in response to verifying that 1 bit or 2 bits error has occurred in the first wake-up signal (S120), a low power mode entry request signal may be transmitted to the smart key control apparatus in response to the first wake-up signal (S130). In particular, the low power mode entry request signal may be an error signal that provides (e.g., provides notification of) information related to 1 bit or 2 bits error.

The smart key control apparatus may fail in the authentication of the smart key from the signal received at step 'S130' (S140). When the authentication of the smart key fails at step 'S140', the smart key control apparatus may be configured to transmit a control signal that requests an entry to the low power mode to the neighboring portable terminal according to the low power mode entry request signal at step 'S130' (S150). In particular, a process of searching a neighboring portable terminal or determining information of pre-registered portable terminal may be proceeded before step 'S150'.

Moreover, the portable terminal may enter the low power mode according to the low power mode entry request received at step 'S150' (S160), and may be configured to transmit the response signal for notifying the smart key control apparatus of the entry into the low power mode (S170). In particular, the smart key control apparatus may be configured to transmit a second wake-up signal (second WAKE UP) to the smart key to re-authenticate the smart key in response to determining that the portable terminal enters the low power mode by the response signal received at step 'S170' (S180).

FIG. 6 illustrates an exemplary operation flow of controlling a release of the low power mode of the portable terminal during authentication completion between the smart key control apparatus and the smart key. Referring to FIG. 6, the smart key control apparatus may be configured to transmit a second wake-up signal (second WAKE UP) to the smart key to re-authenticate the smart key when the portable terminal enters the low power mode (S200).

Further, the smart key (FOB) 20 may be configured to read the second wake-up signal received at 'S200' (S210). When the data bit of the second wake-up signal is substantially similar to a pre-stored data bit as a result of the reading at step 'S210', the smart key (FOB) 20 may be configured to confirm the second wake-up signal (S220), and transmit the response signal to the smart key control apparatus in response to the second wake-up signal (S230). In particular, the response signal may include reception completion information related to the second wake-up signal.

The smart key control apparatus may be configured to complete the smart key authentication based on the response signal received at step '230' (S240). Then, the smart key control apparatus may be configured to transmit a control signal that requests a release of the low power mode to the portable terminal that entered into the low power mode (S250). The portable terminal may be configured to release the low power mode based on the low power mode entry request received at 'S250' (S260), and transmit the response signal to notify the smart key control apparatus that the low power mode is released (S270). In particular, when determining that the low-power mode of the portable terminal is released by the response signals received at 'S270', the smart key control apparatus may be configured to perform a communication between smart keys (S280), and, as a result, start the operation of the vehicle.

According to the exemplary embodiments of the present invention, the portable terminal may be controlled to enter a low power mode when the communication between the smart key control apparatus and the smart key is affected by the electromagnetic waves generated from a portable terminal nearby (e.g., within a predetermined range of) the vehicle, and the communication between the smart key control apparatus and the smart key may be performed more stably by authenticating the smart key in the smart key control apparatus when the portable terminal enters the low power mode.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. A smart key control apparatus comprising:

a smart key controller configured to transmit a wake-up signal for a smart key when a start-up command is detected in a start-off state of a vehicle, and authenticate the smart key based on a response of the smart key that corresponds to the wake-up signal;

a peripheral controller configured to adjust a power level of a neighboring portable terminal when an authentication for the smart key fails; and a communicator configured to transmit and receive a signal between the smart key and the portable terminal.

2. The smart key control apparatus of claim 1, wherein the peripheral controller is configured to transmit a control signal that requests an entrance of the portable terminal into a low power mode.

3. The smart key control apparatus of claim 2, wherein the peripheral controller is configured to determine a power mode status of the portable terminal based on a response signal from the portable terminal that corresponds to the control signal.

4. The smart key control apparatus of claim 2, wherein the peripheral controller is configured to transmit a control signal that requests a release of the low power mode of the portable terminal during a completion of the authentication of the smart key when the portable terminal enters the low power mode.

5. The smart key control apparatus of claim 1, wherein the smart key controller is configured to retransmit the wake-up signal when the portable terminal enters the low power mode during authentication failure of the smart key.

6. The smart key control apparatus of claim 1, wherein the smart key controller is configured to determine failure of the authentication of the smart key when an error signal generated from the smart key is received when 1-bit or 2-bit error for the wake-up signal occurs.

7. The smart key control apparatus of claim 1, wherein the smart key controller is configured to determine failure of the authentication of the smart key when a response signal is not received within a certain period of time from the smart key in response to the wake-up signal.

8. The smart key control apparatus of claim 1, wherein the communicator is configured to transmit a signal to the smart key using a low frequency (LF) communication method, and receive a signal from the smart key using a radio frequency (RF) communication method.

9. The smart key control apparatus of claim 1, wherein the communicator is configured to transmit and receive a signal with the portable terminal using a short-distance wireless communication method selected from a group consisting of: a near field communication (NFC) and Bluetooth.

10. A method of controlling a smart key, the method comprising:

transmitting, by a smart key controller, a wake-up signal for the smart key when a start-up command is detected in a start-off state of a vehicle;

authenticating, by the smart key controller, the smart key based on a response of the smart key that corresponds to the wake-up signal;

requesting, by a peripheral controller, an entrance of a neighboring portable terminal into a low power mode when an authentication for the smart key fails; and retransmitting, by the smart key controller, the wake-up signal when the portable terminal enters the low power mode.

11. The method of claim 10, after retransmitting the wake-up signal, further comprising:

requesting, by the peripheral controller, a release of the low power mode of the portable terminal during a completion of the authentication of the smart key based on a response of the smart key that corresponds to the wake-up signal.

12. A smart key control system comprising:

a smart key;

a smart key controller configured to transmit a wake-up signal to the smart key when a start-up command is detected in a start-off state of a vehicle, and adjust a power level generated from surroundings based on a result of key authentication of the smart key by the wake-up signal; and a portable terminal configured to operate in a low power mode by the smart key controller during authentication between the smart key and the smart key controller.

13. A non-transitory computer readable medium containing program instructions executed by a controller, the computer readable medium comprising:

program instructions that transmit a wake-up signal for the smart key when a start-up command is detected in a start-off state of a vehicle;

program instructions that authenticate the smart key based on a response of the smart key that corresponds to the wake-up signal;

program instructions that request an entrance of a neighboring portable terminal into a low power mode when an authentication for the smart key fails; and program instructions that retransmit the wake-up signal when the portable terminal enters the low power mode.

14. The non-transitory computer readable medium of claim 13, further comprising:

program instructions that request a release of the low power mode of the portable terminal during a completion of the authentication of the smart key based on a response of the smart key that corresponds to the wake-up signal.

* * * * *